United States Patent
Bestermann et al.

(10) Patent No.: US 8,244,251 B1
(45) Date of Patent: Aug. 14, 2012

(54) CONCURRENT CALL HANDOVER

(75) Inventors: John R. Bestermann, Suwanee, GA (US); Shi Jin Chen, Alpharetta, GA (US); Tarun Chugh, Roswell, GA (US)

(73) Assignee: Arris Group, Inc., Suwanee, GA (US)

( * ) Notice: Subject to any disclaimer, the term of this patent is extended or adjusted under 35 U.S.C. 154(b) by 16 days.

(21) Appl. No.: 12/870,936

(22) Filed: Aug. 30, 2010

Related U.S. Application Data

(60) Provisional application No. 61/237,831, filed on Aug. 28, 2009.

(51) Int. Cl.
*H04W 36/00* (2009.01)

(52) U.S. Cl. ............... 455/436; 455/552.1; 370/331; 370/338

(58) Field of Classification Search .......... 455/436–439, 455/444, 426.1, 466, 552.1; 370/331, 332, 370/328, 338
See application file for complete search history.

(56) References Cited

U.S. PATENT DOCUMENTS

| | | | |
|---|---|---|---|
| 6,633,555 B1 * | 10/2003 | Lu et al. ..................... | 370/331 |
| 7,085,260 B2 * | 8/2006 | Karaul et al. ............... | 370/352 |
| 7,657,262 B2 * | 2/2010 | Grayson ...................... | 455/444 |
| 7,835,742 B2 * | 11/2010 | Jaakkola et al. ............. | 455/436 |
| 7,899,458 B2 * | 3/2011 | Kakishima et al. .......... | 455/436 |
| 8,095,175 B2 * | 1/2012 | Todd et al. ................ | 455/552.1 |
| 2004/0203788 A1 * | 10/2004 | Fors et al. ................... | 455/439 |
| 2007/0032236 A1 * | 2/2007 | Kim et al. ................... | 455/436 |
| 2010/0009674 A1 * | 1/2010 | Sapkota et al. ............ | 455/426.1 |
| 2010/0215018 A1 * | 8/2010 | Ejzak .......................... | 370/331 |

* cited by examiner

*Primary Examiner* — Cong Tran
(74) *Attorney, Agent, or Firm* — Troy A. Van Aacken; Robert J. Starr

(57) ABSTRACT

Methods, systems, and apparatus can be used to provide concurrent call handover in converged networks. In various examples, a concurrent call handover can operate to transfer multiple calls between domains when a mobile device has two open call instances. In some implementations, multiple public service identifiers can be assigned for the call instances.

12 Claims, 5 Drawing Sheets

CONCURRENT CALL HANDOVER

RELATED APPLICATIONS

This application is a non-provisional application claiming the benefit of U.S. Provisional Application Ser. No. 61/237,831, entitled "Concurrent Call Handover," the entirety of which is hereby incorporated by reference.

TECHNICAL FIELD

This disclosure relates to handover of calls between a cellular domain and a wireless domains.

BACKGROUND

Mobile communications devices have become ubiquitous in modern society. Mobile communications devices can typically allow users to make telephone calls, send or receive electronic mail (e-mail), browse the world wide web, check appointments, and get directions, as well as perform many other functions. Telephone calls are typically handled via cellular networks. However, cellular networks can vary in quality and coverage area. Improving the coverage of mobile communications devices can improve service quality and thereby increase use of mobile communications devices.

BRIEF DESCRIPTION OF THE DRAWINGS

Like reference numbers and designations in the various drawings indicate like elements.

DETAILED DESCRIPTION

In some implementations of this disclosure, systems and methods can operate to provide call handover between domains in converged networks. This disclosure describes the high level changes detailed on the various components of the fixed mobile convergence (FMC) solution for implementation the call hold and call waiting handover feature. The components used in supporting this feature can include a converged services platform (CSP), a service location register (SLR), a network management system (NMS) and an FMC client on the handset.

Existing implementations of the fixed mobile convergence FMC solution do not support handover of the calls if the user has more than one standing call. For example, if a call is placed on hold on a handset and the handset then tries to switch the domain (e.g., wifi to gsm), the request to handover the call is denied by the mobility application server (MAS). In these existing implementations the MAS cannot always know the current status (active or on hold) of a call on the client side. Moreover, when there are multiple calls are established on a handset and the handset tries to do a handover, such implementations cannot inform the MAS which call is trying to do the handover first. In these implementations, the SLR also contains multiple anchor points in this case; one for each call. Therefore, the handover request in existing implementations is rejected by the MAS because it cannot identify which call is trying to handover first.

In some implementations, call handover between domains can include using a two handover public service identity (PSI) approach to solve the problem of call hold and call waiting handover. The handset can use the first HO PSI to handover the first call (e.g., the oldest call) and the second HO PSI to handover the second call (e.g., the most recent call). The MAS can also keep track of the duration of the calls. So, when the MAS receives a handover request, it knows which call was established (answered) first. The following disclosure describes various implementations and changes operable to facilitate the call handover feature in more detail.

Figure 1:
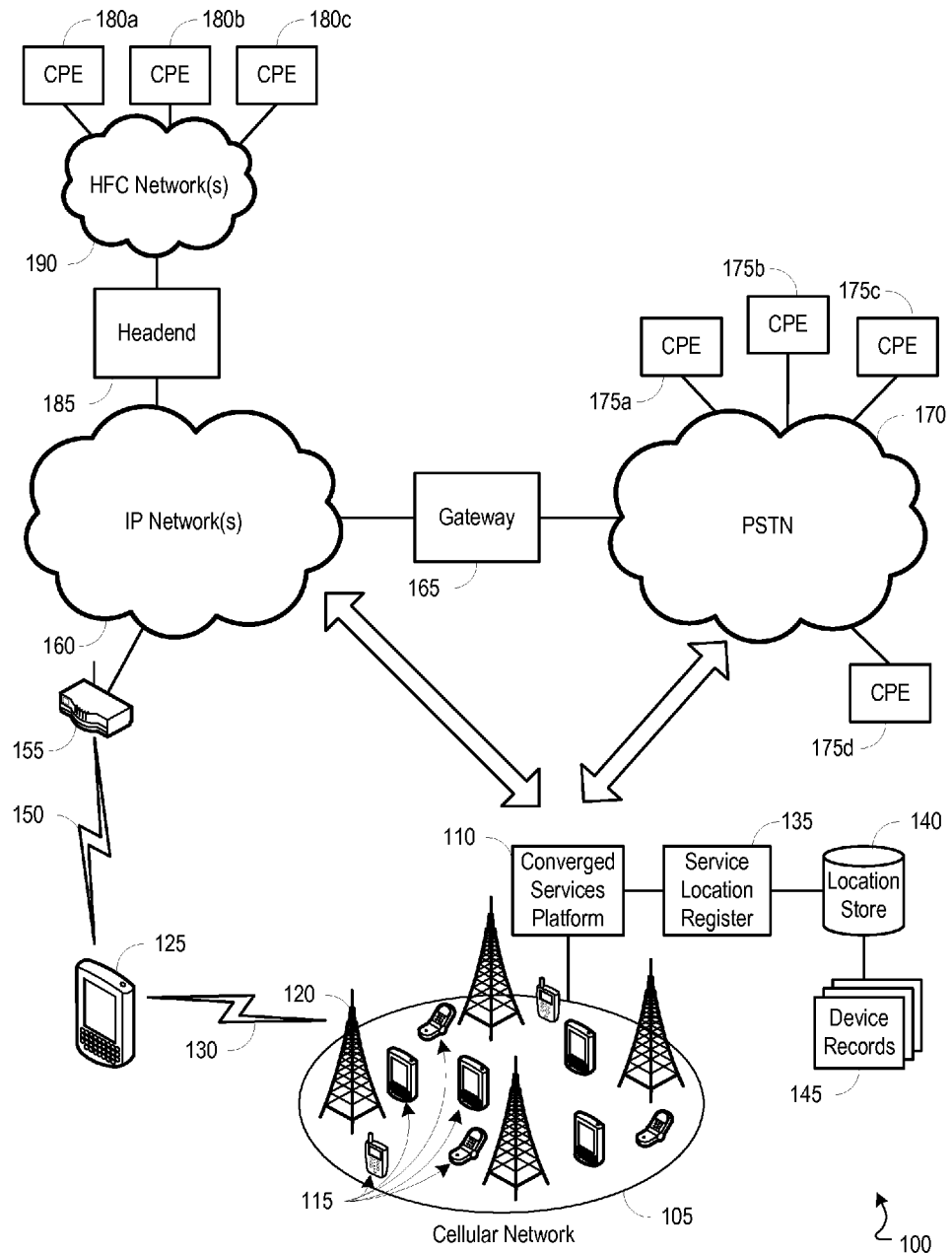
FIG. 1 is a block diagram illustrating an exemplary network environment operable to provide call delivery in converged networks.

FIG. 1 is a block diagram illustrating an example network environment 100 operable to provide call handover of multiple PSIs between domains in converged networks. In some implementations, a cellular network 105 can include a converged services platform (CSP) 110, which can include a mobility application server (MAS). The cellular network 105 can further include a number of mobile communications devices 115 and cellular towers 120. Each of the cellular towers can communicate with mobile communications devices 115, 125 in a cell assigned to that cellular tower. For example, mobile communications device 125 can communicate with the cellular tower 120 via wireless link 130.

To facilitate routing of telephone calls to the mobile communications device 125, a home location register (HLR) periodically receives an update (e.g., a location beacon) from the mobile communications device 125. The HLR identifies the location (e.g., cell) associated with the mobile communications device 125 and stores the location information in a current location store such that incoming calls destined for the mobile communications device 125 can be properly routed. Thus, for example, an incoming call can be routed to a cellular tower 120 closest in proximity to the mobile communications device 125 (e.g., the cellular tower responsible for the cell from which the last beacon signal was received).

In some implementations, the converged services platform 110 can include a service location register (SLR) 135. The SLR 135 can operate to provide routing information to the CSP 110 route calls to a cellular tower or wi-fi access point based upon retrieval of current location information associated with a mobile communications device retrieved from a current location store.

In some implementations, mobile communications devices (e.g., mobile communications device 125) can also communicate via wireless data link 150 with a WLAN device, such as, for example, a wireless access point 155. The wireless router 155 can be connected to a packet based network, such as an IP network 160. In additional implementations, when a wireless data link 150 is available, the converged services platform 110 can route an incoming call to the mobile communications device 125 through the IP network 160 via a wireless access point 155 and the wireless data link 150.

However, it should be understood that calls routed through the wireless data link 150 only have a limited range, thereby reducing the mobility of the user. This reduced mobility, in turn, reduces the utility of the mobile communications device 125 to the user. In some implementations, the converged services platform 110 can operate to switch calls between a wireless data interface and a cellular interface using the PSI associated with the call. Thus, when a user moves his/her mobile communications device 125 out of range of a wireless data access point device 155, the converged services platform 110 can hold the call open and reconnect to the device 125 via a cellular interface of the device 125. Alternatively, if the device moves out of range of the wireless data access point device 155, and into range of another wireless data access point device (not shown), the call can be routed to the new wireless data access point. Thus, in some implementations, the converged services platform 110 can facilitate call handoff between multiple different wireless access points. In some such implementations, the mobile communications device 125 can hold open a cellular control signal link to the converged services platform 110, thereby facilitating handoff between the data network and the cellular network.

In those instances where a call is routed from an IP network 160 to the PSTN network 170, or a call is routed from the PSTN network 170 to an IP network 160 a gateway 165 can be used to translate communication protocols between the networks. For example, the gateway 165 can convert packet based voice communications to circuit switched voice for transmission on the PSTN 170, and can convert circuit switched voice to packet based voice communications for transmission on an IP network 160.

In some implementations, calls can also be originated or routed to CPE devices 180a-c via a headend 185 and one or more hybrid fiber coax (HFC) networks 190. The headend 185 and hybrid fiber coax network(s) 190 can be provided by multiple service operators (MSOs) which provide community antenna television (CATV) to subscribers.

It should be understood that while the converged services platform 110 can reside on any of the networks (e.g., HFC 190 (e.g., within a headend 185), IP network 160, PSTN 170, or cellular network 105). Thus, for example, a call destined for a CPE device 180a-c can be rerouted to an associated mobile communications device 125 via a cellular link 130 or a wireless data link 150 based upon routing instructions from the converged services platform 110.

The converged services platform 110 has typically only been allocated a single PSI for call handover functionality. However, in those instances where a call has been placed on hold or a call is on call waiting, and the mobile communications device 125 attempts to initiate a domain change (e.g., wi-fi to gsm), the domain change is denied by the converged services platform 110 because the converged services platform 110 is unable to identify the call for which the device 125 is attempting to perform the handover for first.

In some implementations, the converged services platform 110 can keep track of two PSI call identifiers and the device 125 can be provisioned for multiple PSIs, thereby facilitating call handover in situations where the device 125 has two or more open sessions. In additional implementations, the device 125 can be set to attempt to handover the oldest session (e.g., first initiated call) first, and the most recent session (e.g., last initiated call) last. In such implementations, the converged services platform 110 and the device 125 can keep track of the duration of the sessions open by a device 125, such that the converged services platform 110 can know which session is being handed over first, and which session is being handed over last (and the order of any other sessions being handed over).

Figure 2A:
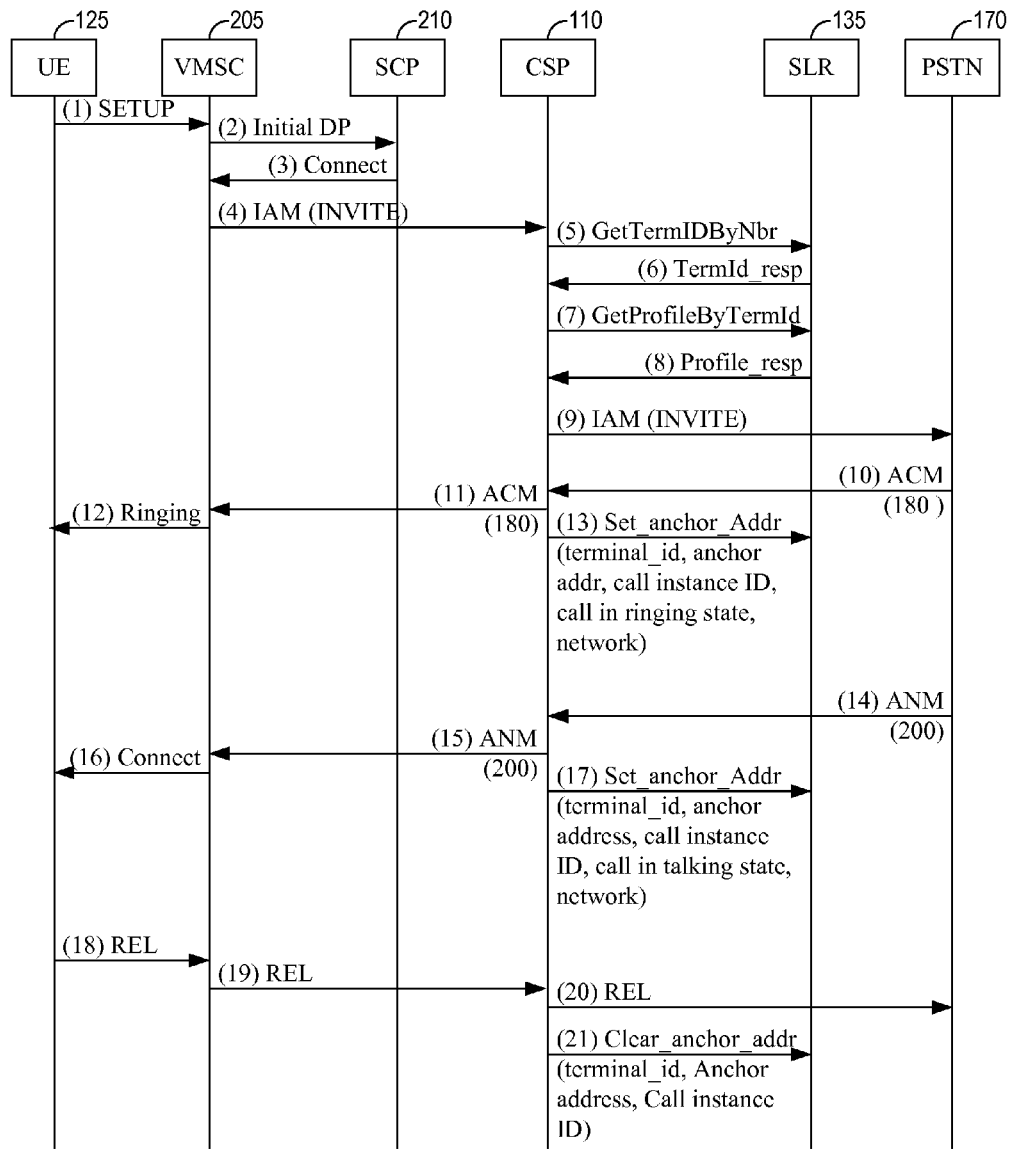
FIG. 2A is a call flow diagram illustrating an example call flow for setting up a call.

FIG. 2A is a call flow diagram illustrating set up and tear down of a converged services call. At stage (1) call setup is initiated by a message sent from the user equipment 110 to a visited mobile switching center (VMSC) 205. The visited mobile switching center 205 can reside within a cellular network (e.g., cellular network 105 of FIG. 1).

At stage (2), an initial dial pulse is sent to a service control point (SCP) 210. The SCP is typically part of the signaling network associated with the public switched telephone network (PSTN). At stage (3), the SCP 210 responds to the initial dial pulse with a connection signal to the VMSC 205. The VMSC 205 can respond at stage (4) with an initiating address message (IAM) invite to the converged services platform (CSP) 110.

At stage (5), the CSP 110 can send a "GetTermIDByNbr" message to the service location register (SLR) 135. The "GetTermIDByNbr" message can request the Terminal ID from the CSP 110. At stage (6), the SLR 110 can response to the "GetTermIDByNbr," with a "TermID_resp" message, which can include the terminal identification. The CSP 110 can then retrieve the profile associated with the terminal by sending a "GetProfileByTermID" message to the SLR 135 at stage (7). At stage (8), the SLR 135 can respond to the "GetProfileByTermID" message with the profile (e.g., "Profile_resp" message).

At stage (9), the CSP 110 can send an IAM invitation to the PSTN 170. The PSTN 170 can respond to the IAM invitation with an address complete message (ACM) at stage (10). The CSP 110 forwards the ACM to the VMSC 205 at stage (11), and the VMSC 205 sends a ringing signal to the user equipment 125 at stage (12).

At stage (13), the CSP 110 sets the anchor address for the session by sending a "set_anchor_addr" message to the SLR 135. Setting the anchor address can include setting the terminal ID (e.g., the identification of the mobile communications device), setting an anchor address, setting a call instance identifier, setting a status of the call (e.g., call active, call in ringing state, etc.), and setting a network identification for which network the session is using (e.g., wi-fi, GSM, etc.).

At stage (14) an answer message (ANM) is initiated from the PSTN, indicating that the recipient has answered the IAM message. The ANM can be sent to the CSP 110, and relayed to the VMSC 205 at stage 15. The VMSC 205 can then send a connect notification to the user equipment at stage (16). Upon connection, the CSP 110 can send a new "set_anchor_addr" message to the SLR 135, notifying the SLR 135 that the session is now in an "active" or "talking" state at stage (17).

At stage (18) the user equipment originates a call termination (e.g., signified by a "REL" message to the VMSC 205). The REL message can be relayed to the CSP 110 at stage (19), and to the PSTN 170 at stage (20). In response to receiving the REL message, the CSP 110 can send a "Clear_anchor_addr" message to the SLR 135 at stage (21).

Figure 2B:
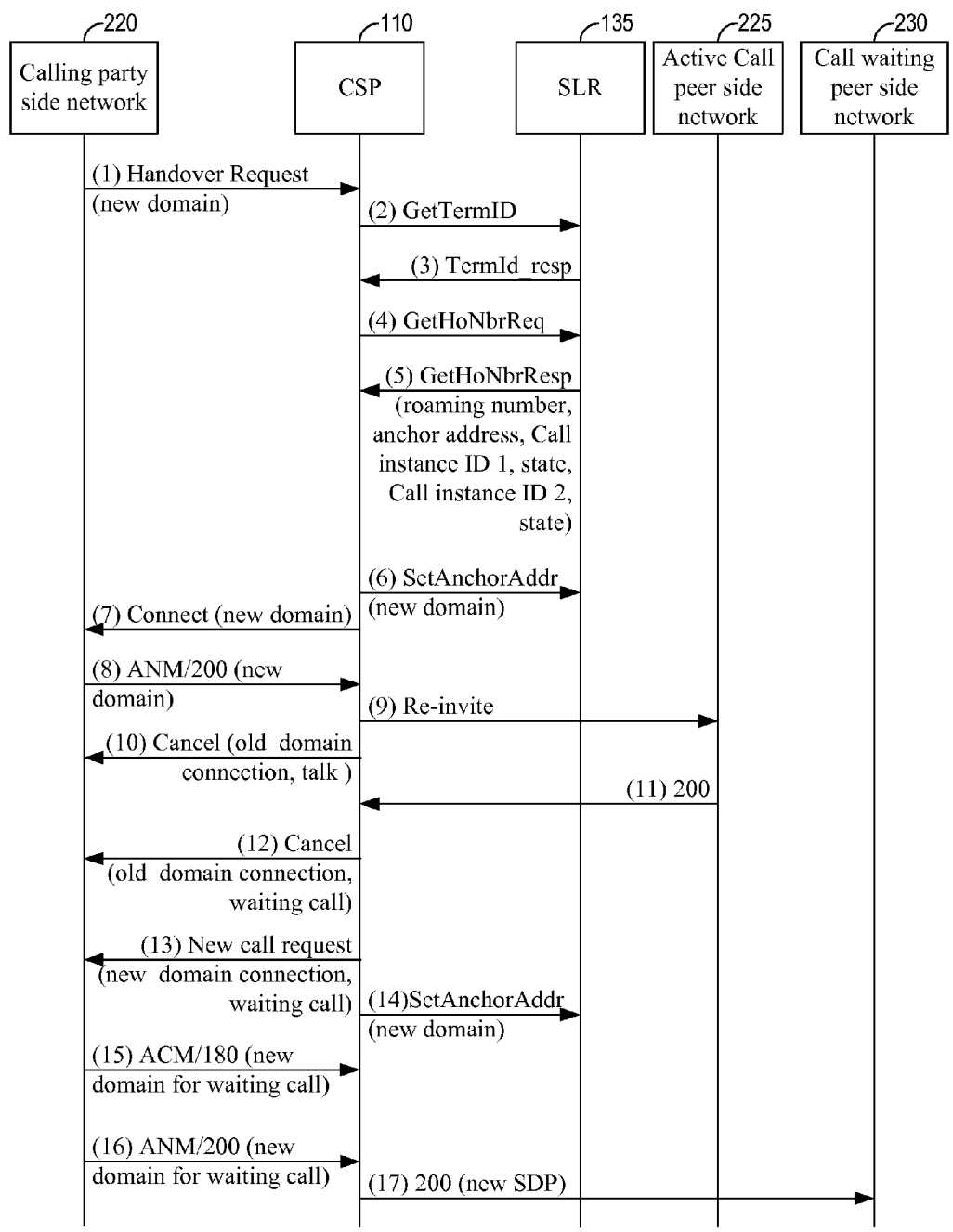
FIG. 2B is a call flow diagram illustrating an example call flow handover during call waiting.

FIG. 2B is a call flow diagram illustrating domain transfer for a call waiting call. At stage (1) a handover request is received from a calling party side network 220. A mobile communications device associated with a calling party can be connected to the CSP 110 through the calling party side network 220 (e.g., cellular network 105 of FIG. 1). The handover request can be sent to the CSP 110.

At stage (2), in response to receiving the handover request, the CSP 110 can send a "GetTermIDbyNbr" message to the SLR 135. The "GetTermIDbyNbr" message can be operable to retrieve the terminal ID associated with the device requesting the handover (e.g., mobile communications device 125 of FIG. 1). The SLR 135 then sends a "TermID_resp" message to the CSP 110 at stage (3). The "TermID_resp" message provides the CSP 110 with the terminal identification.

At stage (4) the CSP 110 sends a "GetHoNbrReq" message to the SLR 135. The "GetHoNbrReq" message is operable to request a handover number from the SLR 135. In response to the "GetHoNbrReq" the SLR 135 is operable to respond with a "GetHoNbrResp" to the CSP 110 at stage (5). The "GetHoNbrResp" is operable to provide a roaming number, an anchor address, a first call instance identifier and state for the first call instance, and a second call instance identifier and a state for the second call instance (and any other call instance identifiers and states for additional calls beyond two).

At stage (6), the CSP 110 sends a "SetAnchorAddr" message to the SLR 135. The "SetAnchorAddr" message is operable to set a new anchor address (e.g., a new domain) for the calls associated with the device. At stage (7), the CSP 110 sends a connect message to the calling party network 220. At stage (8), the calling party network 220 sends an ANM message to the CSP 110 acknowledging the new domain. At stage (9), the CSP 110 sends a reinvite message to the active called party peer side network 225. The reinvite message is operable to notify the active called party that the handover is being made. At stage (10), the CSP sends a cancel message to the calling party network 220. At stage (11), the active called party network acknowledges the reinvite message notifying the called party network of the domain change.

At stage (12), the CSP 110 sends a cancel message for the call waiting call to the calling party network 220. At stage (13), the CSP 110 sends a new call request message to the calling party network for the call waiting call on the new domain connection. At stage (14), the CSP 110 sends a "SetAnchorAddr" message to the SLR 135 notifying the SLR 135 of the new domain for the call waiting call. At stage (15), the calling party network 220 sends an ACM message to the CSP 110 for the call waiting call on the new domain. At stage (16), the calling party network 220 sends an ANM message to the CSP 110 acknowledging the new call request on the new domain for the call waiting call. At stage (17), the CSP sends a message to the call waiting party network 230 notifying the call waiting party's network 230 of the new SDP.

Figure 2C:
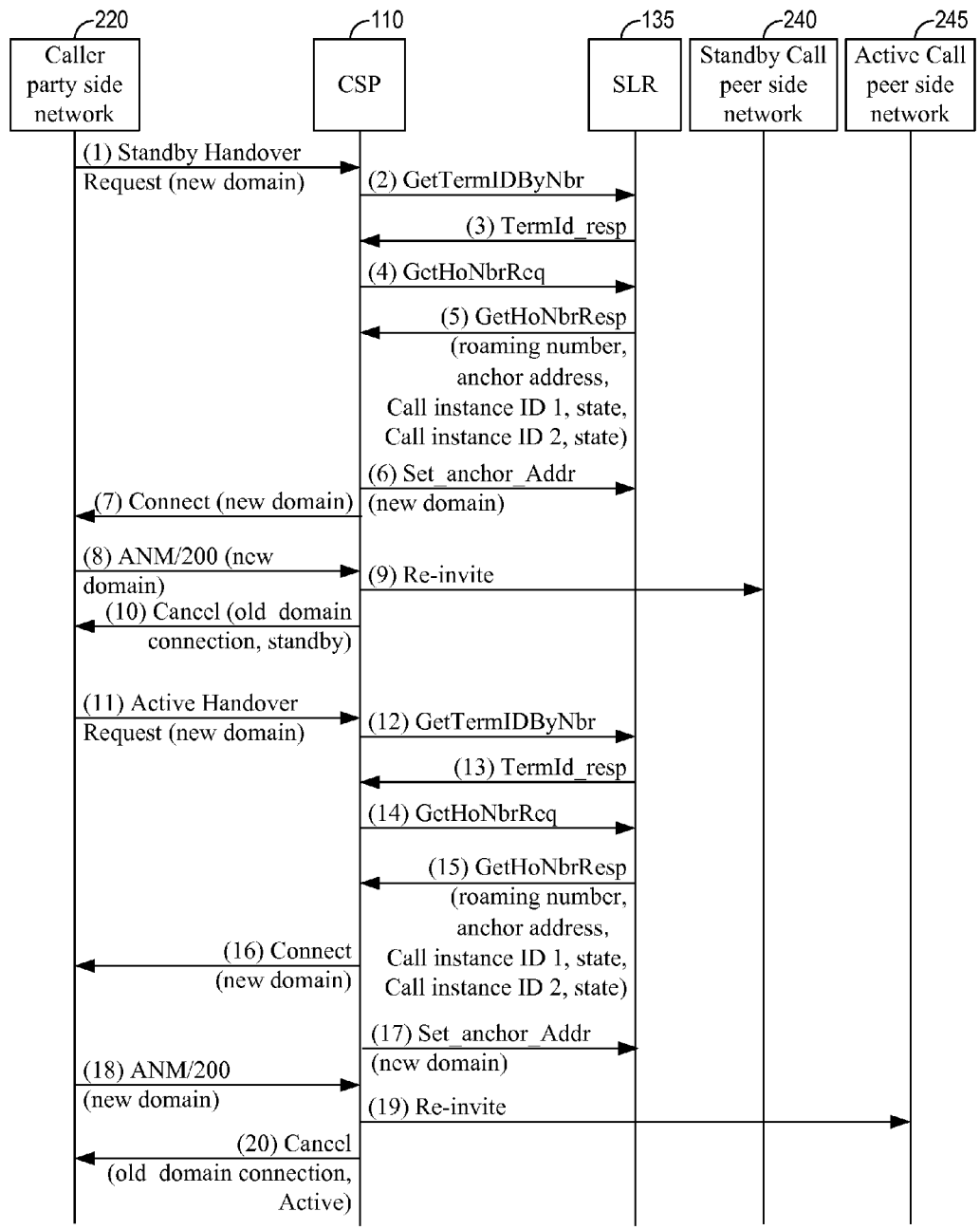
FIG. 2C is a call flow diagram illustrating an example call flow handover during with a standby call.

FIG. 2C is a call flow diagram illustrating domain transfer for a standby call (e.g., a call on hold). At stage (1) a standby handover request is received from a calling party side network 220 to handover the call on standby. A mobile communications device associated with a calling party can be connected to the CSP 110 through the calling party side network 220 (e.g., cellular network 105 of FIG. 1). The handover request can be sent to the CSP 110.

At stage (2), in response to receiving the standby handover request for the standby party, the CSP 110 can send a "GetTermIDbyNbr" message to the SLR 135. The "GetTermIDbyNbr" message can be operable to retrieve the terminal ID associated with the device requesting the handover (e.g., mobile communications device 125 of FIG. 1). The SLR 135 then sends a "TermID_resp" message to the CSP 110 at stage (3). The "TermID_resp" message provides the CSP 110 with the terminal identification.

At stage (4) the CSP 110 sends a "GetHoNbrReq" message to the SLR 135. The "GetHoNbrReq" message is operable to request a handover number from the SLR 135. In response to the "GetHoNbrReq" the SLR 135 is operable to respond with a "GetHoNbrResp" to the CSP 110 at stage (5). The "GetHoNbrResp" is operable to provide a roaming number, an anchor address, a first call instance identifier and state for the first call instance, and a second call instance identifier and a state for the second call instance (and any other call instance identifiers and states for additional calls beyond two).

At stage (6), the CSP 110 sends a "SetAnchorAddr" message to the SLR 135. The "SetAnchorAddr" message is operable to set a new anchor address (e.g., a new domain) for the calls associated with the device. At stage (7), the CSP 110 sends a connect message to the calling party network 220. At stage (8), the calling party network 220 sends an ANM message to the CSP 110 acknowledging the new domain. At stage (9), the CSP 110 sends a reinvite message to the standby called party peer side network 225. The reinvite message is operable to notify the standby called party that the handover is being made. At stage (10), the CSP sends a cancel message to the calling party network 220. At stage (11), the calling party network 220 sends an active handover request to the CSP 110 for the active call.

At stage (12), in response to receiving the active handover request, the CSP 110 can send a "GetTermIDbyNbr" message to the SLR 135. The "GetTermIDbyNbr" message can be operable to retrieve the terminal ID associated with the device requesting the handover (e.g., mobile communications device 125 of FIG. 1). The SLR 135 then sends a "TermID_resp" message to the CSP 110 at stage (13). The "TermID_resp" message provides the CSP 110 with the terminal identification.

At stage (14) the CSP 110 sends a "GetHoNbrReq" message to the SLR 135. The "GetHoNbrReq" message is operable to request a handover number from the SLR 135. In response to the "GetHoNbrReq" the SLR 135 is operable to respond with a "GetHoNbrResp" to the CSP 110 at stage (15). The "GetHoNbrResp" is operable to provide a roaming number, an anchor address, a first call instance identifier and state for the first call instance, and a second call instance identifier and a state for the second call instance (and any other call instance identifiers and states for additional calls beyond two).

At stage (16), the CSP 110 sends a connect message to the calling party network 220. At stage (17) the CSP 110 sends a "SetAnchorAddr" message to the SLR 135. The "SetAnchorAddr" message is operable to set a new anchor address (e.g., a new domain) for the calls associated with the device. At stage (18), the calling party network 220 sends an ANM message to the CSP 110 acknowledging the new domain. At stage (19), the CSP 110 sends a reinvite message to the active called party peer side network 225. The reinvite message is operable to notify the active called party that the handover is being made. At stage (20), the CSP sends a cancel message to the calling party network 220.

Figure 3:
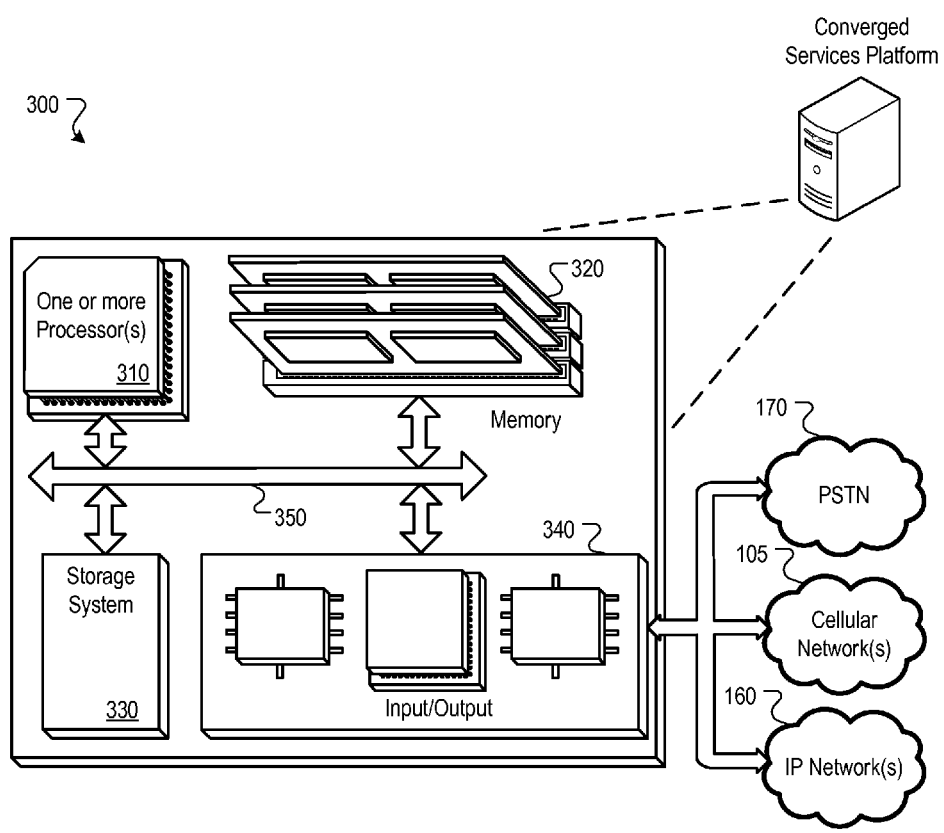
FIG. 3 is a block diagram illustrating an example converged call routing system operable to provide call delivery in converged networks.

FIG. 3 is a block diagram illustrating an example converged services platform operable to provide concurrent call handover. The converged services platform 300 can include a processor 310, a memory 320, a storage device 330, and an input/output device 340. Each of the components 310, 320, 330, and 340 can, for example, be interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330.

The memory 320 stores information within the device 300. In one implementation, the memory 320 is a computer-readable medium. In one implementation, the memory 320 is a volatile memory unit. In another implementation, the memory 320 is a non-volatile memory unit.

In some implementations, the storage device 330 is capable of providing mass storage for the device 300. In one implementation, the storage device 330 is a computer-readable medium. In various different implementations, the storage device 330 can, for example, include a hard disk device, an optical disk device, flash memory or some other large capacity storage device.

The input/output device 340 provides input/output operations for the device 300. In one implementation, the input/output device 340 can include one or more of a PSTN trunk interface (e.g., an RJ11 connector), an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

The converged call routing system (e.g., converged home location register) of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory or a random access memory or both. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, implementations of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular implementations of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A computer implemented method, comprising:
    receiving a call handover request from a mobile communications device at a converged services platform;
    determining that multiple call instances are associated with the mobile communications device;
    identifying a first call instance and a second call instance from a service location register; and
    setting a new anchor address for the first call instance before setting the new anchor address for the second call instance, the new anchor address comprising the new domain.

2. The computer implemented method of claim 1, wherein the service location register is operable to store multiple public service identifiers for a mobile device.

3. The computer implemented method of claim 2, wherein the public service identifier comprises a call status for each of the identified calls.

4. The computer implemented method of claim 3, wherein the call status comprises a standby call.

5. The computer implemented method of claim 3, wherein the call status comprises a call waiting.

6. The computer implemented method of claim 1, wherein the new domain comprises one of a wireless data domain or a cellular network domain.

7. The computer implemented method of claim 1, wherein identifying a first call instance and a second call instance from a service location register comprises retrieving records associated with the first and second call instances.

8. A system, comprising:
    a mobile applications server operable to receive a handover request from a mobile communications device, the call handover request comprising a request to move the mobile communications device from a cellular domain to a wi-fi domain, the mobile applications server being operable to identify multiple call instances associated with the mobile communications device; and
    a service location register operable to communicate a public service identity for each of the multiple call instances to the mobile applications server;
    wherein the mobile applications server is further operable to use the public service identity for each of the multiple call instances to facilitate sequential handovers of each of the multiple call instances to the wi-fi domain using the public service identity respectively associated with each of the multiple call instances.

9. The system of claim 8, wherein a sequence associated with the sequential handovers is based upon a priority associated with each of the multiple call instances.

10. The system of claim 9, wherein the sequence associated with the sequential handovers is based upon pendencies of respective calls obtained from the service location register.

11. The system of claim 9, wherein the sequence associated with the sequential handovers is based upon call state of each of the multiple call instances obtained from the service location register.

12. The system of claim 8, wherein the mobile applications server facilitates a handover of a call by setting a new anchor address for a first call instance before setting a new anchor address for a second call instance.

* * * * *